United States Patent [19]
Shapira

[11] Patent Number: 5,993,866
[45] Date of Patent: Nov. 30, 1999

[54] PROCESS OF MAKING FOOD PRODUCTS HAVING REDUCED METHIONINE RATIOS

[76] Inventor: Niva Shapira, 5 Kehilat Zitumir, 69405 Tel Aviv, Israel

[21] Appl. No.: 08/928,676

[22] Filed: Sep. 12, 1997

Related U.S. Application Data

[63] Continuation-in-part of application No. PCT/IL97/00080, Mar. 5, 1997.

[51] Int. Cl.$^6$ ....................................................... A23L 1/30
[52] U.S. Cl. .............................. 426/72; 424/439; 426/74; 426/648; 426/656
[58] Field of Search ................................ 426/72, 74, 648, 426/656; 424/439

[56] References Cited

U.S. PATENT DOCUMENTS 4,871,550  10/1989  Millman .
5,451,412   9/1995  Bounous et al. .
5,545,670   8/1996  Bissbort et al. ......................... 514/562

OTHER PUBLICATIONS

CA 75:149135d Kazemi et al., Poultry Science. 1971, vol. 50(5).
CA101:22159q Blattna et al. Science—Res. Ind., 1984(4).
CA103:140562e Scott et al. J. Dairy Res. 1985, 52(4).
CA105:152033n Uiterwaal et al. 1986, EP 183,305.
CA107:95772t Int. J. Vitam. Nutr. Res. 1987, 57(2).

*Primary Examiner*—Helen Pratt
*Attorney, Agent, or Firm*—Mark M. Friedman

[57] ABSTRACT

The present invention relates to modified food products, and especially low homocysteinogenic dairy products, where the modification requires enriching the food product with Vit B6, and optionally Folic acid, B12, and Mg. High Methionine foods, as well as low B6 intake can cause methionine load with resulting increase of hyper HCY. Folic acid is another major factor in reducing HCY. Hyper homocysteine (HCY) has been recently defined as an independent risk factor for CVD (Cardio Vascular Diseases) and can cause damage in other conditions i.e. mental, skeletal and Immunological.

10 Claims, No Drawings

PROCESS OF MAKING FOOD PRODUCTS HAVING REDUCED METHIONINE RATIOS

CROSS-REFERENCES TO RELATED APPLICATIONS

This is a continuation-in-part of PCT/IL97/00080, filed Mar. 5, 1997.

The present invention relates to foods, particularly dairy products, modified for reducing the homocysteinogenic potential, by enriching with Vit B6 and optionally folic acid, magnesium, the cofactors of homocysteine metabolism, thus reducing the ratio of methionine, the ultimate source of homocyteine to these vitamins, minerals and/or nutrients.

The food modifications for reducing the homocysteinogenic potential is accomplished by modifying the ratio between the methionine, the ultimate source of homocysteine and the nutritional cofactors involved in further metabolism of the homocysteine: mainly B6 and optionally with folic acid, B12, magnesium, cysteine.

Two methods of application of the invention, internal to the food products and by external application (i.e., by adding sauces, dips, gravies, and syrups enriched with B6 and optionally folic acid, magnesium), are described.

As high methionine foods confer a methionine load which cause post ingestion increase in plasma homocysteine, and as exposure to high homocysteine was found to bear cardio vascular risk, it is advisable to modify foods with high homocysteinogenic potential, in order to reduce the resulting damaging effects.

The two main pathways for reducing the homocystein are:
1. via remethylation back to methionine (the cofactors of this pathway are folic acid, B12, Betaine); and
2. via the transulfuration to cysteine, taurine and S04 (the main cofactor here is B6). Thus, it is expected that the higher methionine concentration in the food serving and the lower the B6, the higher the potential risk for post ingestion increase in methionine and homocysteine. Thus, it will be advised to modify the homocysteinogenic ratio, namely reducing the methionine: B6 ratio by enriching the high methionine foods with B6, proportionally to the concentration of methionine.

Most of the scientific literature regarding to the significance of hyperhomocysteinemia relates to cardio-vascular-disease (CVD). However, it has been found that hyperhomocysteinemia is associated also with other health and mental risks, e.g. high homocysteine (HCY) and manic depressions, seizure disorders, depression, asthma and migraine headaches. All said diseases respond extremely well to Vit B6 therapy. (Braverman and Pfeiffer, 1987, In: The Healing nutrients within, D. Homocysteine, p. 155–162, Keats publish. Inc. New Canaan, Conn.). This can be done due to the fact that HCY is a most excitatory amino acid. Representative reports regarding recent research evidence on the mental implications of hyper-HCY and/or interrupted sulfur-amino acid metabolism are in particular presented in the following articles:

Regland et. al., J. Neural. Transmission general section, 1994, 98(2):143–152; Regland et. al., 1995 J. Neural Transmission, general section, 100(2):165–9; Santhosh et. al., 1995, Medical Hypothesis, 43(4): 239–244).

HCY or tHCY in connection with the present invention refer to the sum of the multiple forms of homocysteine, homocystine and cystein-homocysteine complex.

The significance of hyper-HCY for skeletal and cross linking of collagen was also documented in animal models and in humans. (Cook et. al., 1994, Poult. Sci. 73(6):889–96; Wolos et. al., 1993, J. Immunol. 151(1):526–34; Levene et. al., 1992, Int. J. Exp. Pathol. 73(5):613–24; Masse et. al., 1990, Scanning. Microsc. 4(3):667–73 discussion on p. 674).

The issue of the relationship of CVD and of hyper-HCY was recently recognized as a major dietary risk factor. (Stampfer et. al., 1992, JAMA, 268:877–881; Dywer, 1995, J. Nutr. 125 (3rd supplement); 656–665s), and levels of HCY to infract (MI) were found to be common. HCY associated with elevated risk of myocardial infarct (MI) are common among U.S. adults. (Willet, 1995, J. Nutr. 125 (3rd supplement): 647–655s). In the Framingham heart study 20% of the individuals had high plasma HCY which was associated with low intake of Vit B6 and of folic acid. (Selhub et. al., 1993, JAMA, 271:2193–8).

Many studies have shown that elevated total HCY levels are frequently found in patients suffering from arteriosclerosis effecting coronary, cerebral and peripheral arteries. (Clarke et. al., 1991, N.J. Med. 324:1149–1155); Bors et. al., 1995, N. Engl. J. Med 818:709–715; Duduman et. al., 1993, Arterioscler. Tromb. 18:1253–1260; Stabler et. al., 1988, J. Clin. Invest. 81:466–1974; Malinow et. al., 1990, Coron. Arter. Dis., 1:215–20; Franken et al., 1994, Arterioscl. Thromb., 14:465–70). Earlier studies had shown that the effect of HCY levels on vascular diseases appeared to be independent from LDL or HDL, the "Good" and the "Bad" cholesterol fractions diabetes mellitus, smoking body mass index, high blood pressure and age.

The above considerations lead to the conclusion that hyper-homocysteinemia is an independent risk factor although some correlations exist between HCY with other risk factors, i.e., between HCY and advanced age, reduced physical activity, increased smoking, higher cholesterol levels and increased diastolic pressure. (Nygard et. al., 1995, JAMA, 274 (19:1526–33). Recently, it was shown that hyper HCY solubles the potential risk of other factors i.e., smoking, overweight, dislipidemia etc.

A meta-analysis provided considerable evidence that elevated HCY levels were associated with an increased risk of arteriosclerotic vascular diseases. This association meets the criteria of causality (Ill AB, 1995, Proc. R. Soc. Med. 58:295–300), consistency, strength, temporality and biological plausibility. Elevated t-HCY levels precedes the occurrence of coronary heart diseases. (Stampler et. al., 1992, JAMA268:877–881). Early signs of premature carotid arterial stenosis were found by ultrasound among heterozygoses for homocysteinuria. (Rubba et. al. 1990, Metabolism 1191–1195; Clarke et. al., 1992, Ir. J. Med. Sci 161:61–65) and in individuals with moderate homocysteinemia. (Malinow et. al., 1993, Circulation, 87:332–329; Sehlhub et. al., 1995, N. Engl. J. Med. 332:286–291); Stampfer et. al., 1995, N. Engl. J. Med. 332:328–329). The association was consistent across studies by different investigators using a variety of methods in different populations of various geographic areas. Both prospective and case-controlled studies indicate a significant positive association. (Boushey et. al., 1995, JAMA, 274:1049–1057).

Biological Mechanisms

For a long time the administration of HCY was used as an experimental tool to demonstrate that endothelial cell damage is probably an essential preliminary factor for the development of atherosclerotic plaques.

Direct toxicity of HCY to the endothelium has been reported in laboratory studies (Dudman et. al., 1993, Atherocler. Thromb., 13:1253–1260; Wall et. al., 1980, Thromb. Res. 18:113–121; Blann, 1994, Atherosclerosis, 94:89–91), but under much higher concentrations than have been found in vivo. (Harker et. al. 1976, J. Clin Invest. 58:731–741; Mudd et. al., 1995, Disorders of transulfuration. The metabolic and molecular bases of inherited disease, New York McGraw-Hill Inc. 1279–1327) Fenton and Rosenberg, 1995, (Inherited disorders, of Cobalamine transport and metabolism in Scriver et. al., Eds, New York McGraw Hill Inc. 3129–3149,) showed endothelial desquamation in vivo in baboons infused with HCY or homocystine at the high levels typical of patients with homocystinuria. HCY has also been shown to increase DNA synthesis in vascular smooth muscle cells being consistent with early arteriosclerotic lesions and to induce these cells to proliferate while impeding the regeneration of endothelial cells (Arker et. al., 1974, N. Engl. J. Med. 291:537–543), to disrupt cross linking and thus to inhibit cysteine also glutathione (Braverman et. al., 1987). Moreover, it causes oxidation of LDL (Heinecke et. al., 1984, J. Clin. Invest., 74:1890–1894), that leads them to be recognized by human arterial smooth muscle cells in culture (Parthasaraty, 1987, Biochim. Biophys. Acta, 917:337–350). The effects of HCY on vascular hemostatic properties have included decreased thrombo modulin cell surface expression and inhibition of protein C activation, thus probably contributing to the development of thrombosis (Rosenblat et. al Inherited disorders of folate transport and metabolism, 1995, New York McGraw Hill Inc. 3111–3128).

Genetic Factors

The variation in serum HCY in the population reflects both genetic and nutrition factors. Comparison of identical and non-identical twins have suggested a high heritability of high HCY levels (Berg et al., 1992, Clin. Genet. 41:315–321; Reed et. al., 1991, Clin. Genet., 89:425–428). However, the presence of proband-spouse correlations indicate a role for nutritional factors. (Williams et. al., Dis. 1990, Coron. Arthery., 1:681–685; Genest et. al., 1991, Arterioscler. Thromb. 11:1129–1136).

A thermolabile variant of methylene tetrahydro folate reductase can explain about 17% of CVD patients and 28% of patients suffering of a premature vascular disease who had hyperhomocysteinemia. The latter condition can be treated by administering folic acid (Kang et. al., 1988, Am. Hum. Genet. 43:414–421).

Altogether the genetic origin of the high HCY can most probably not account for the frequency of hyperhomocysteinemia in the population.

Nutritional Factors

Besides the genetic factors, which in most cases are successfully handled by dietary supplements, hyperhomocysteinemia may result primarily from diet due to either high intake of methionine or inadequate intake of the cofactors Vit B6, folic acid, magnesium, cysteine and/or Vit B12 which are involved in converting HCY into methionine or degradation of HCY to keto-butyrate. Both conditions, namely high methionine and low Vit B6 and/or other cofactors can exist in animal protein, i.e., in dairy products.

The Risk of High Methionine Diets

Feeding rabbits a methionine enriched diet for 6–9 months resulted in a significant increase in plasma and in aortic TBARS levels and in aortic antioxidative enzyme activities. Histological examination of aortas showed typical atherosclerotic changes, e.g. blood vessels' intimal thickening, deposition of cholesterol and calcifications (Toborek et. al., 1995, Atherosclerosis, 115(2):217–24).

In mini pigs, high methionine, caseinate based diet lead to hyperhomocysteinemia which induced vascular alterations favoring the viscous component vs. the elastic component (Roland et. al., 1995, Circulation, 91(4):1161–74.) Tumor cells are totally dependent on exogenous methionine whereas normal cells may substitute for an alternative sulfur compound. This difference was suggested to be used for a therapeutic purpose (Breillout et. al., 1990, J. Nat. Cancer. Inst., 82(20):1628–32).

The Anti-Risk Co-Factors

Vit B6

Homocysteine is a natural amino acid metabolite of the methionine, but it occurs only transiently before being converted into the harmless cystathionine by (Cystathionine synthase). Cystathionine is then cleaved to form cystein, 2-ketobutyrate and ammonium ions (by cystathioninase). Both enzymes involved comprise pyridoxal (Vit B6) phosphate as coenzyme.

It has long been know that low Vit B6 intake may produce arterial intimal damage. McCully et., al., 1975 (Artheriosclerosis, 22:215–227) noted that children with homocysteinuria, characterized by homozygous deficiency of cystathionine synthase, suffer early in life from atherosclerosis. The authors hypothesized that even less extreme levels of homcysteinemia may increase coronary heart disease risk prematurely.

It has been found that the addition of Vit B6 (pyridoxine) is the most effective additive in reducing elevated HCY following a methionine load test, whereas folic acid has been found to be most effective in reducing fasting HCY (Brattstrom et. al., 1990, Atherosclerosis, 81:51–60; Brattstrom et. al., 1992, A. Neural. Res., 14:81). The addition of Vit B6 did not prevent high fasting plasma HCY in adults but it reduced the HCY levels in fast growing rats when the requirements of HCY were increased (Coburn, 1990, Ann. N.Y. Acad. Sci., 585:76–85) as well as under methionine load (Miller et. al., 1992, Am. J. Clin. Nutr. 55:1154–1160). Hyperhomocysteinemiacysteinemia was defined by two alterative measures, namely high fasting level and/or after oral methionine loading. Bother showed to be independent risk factors for CVD (Bostom et. al., Atherosclerosis, 116:147–51). The authors found that 75% of those with post-methionine loading hperHCY had fasting total HCY concentrations below the 75th percentile (10.7 mcmole/l). They therefore concluded that fasting total plasma HCY determination alone fails to identify a sizable percentage, more than 40% of persons who have clinically relevant hyperhomocysteinemeia post methionine loading. This emphasizes the importance of Vit B6 coming together with high methionine foods. Folic acid can reduce HCY by re-mythiation and thus produce methionine. Thus this step seems to be less effective under methionine load.

Vit B6 deficiency can block the pathway of HCY catablism to cystein and thus reduce the availability of cysteine. Accumulated aggregates of HCY with cystein to form mixed disulfides can further lead to secondary cysteine deficiency, that can effect the gluthathione antioxidative system, which is important for cardiovascular health. Diets high in meat and dairy products, which comprise a large amount of methionine, require more Vit. B6, but often contain less B6 due to losses during food processing (Papaioannou, 1986, Medical Hypothesis, cited in Braverman and Pfeiffer al., 1987). Supplementing Vit B6 to rats, following 5 weeks on a Vit B deficient diet based on 70% casein dramatically decreased the liver ratio methionine:HCY which causes the reduction of the ratio PE (phosphatidyl ethanol) to PC (phosphatidyl-choline) in liver microsomes (She et. al., 1995, Biosci. Biotechnol. Biochem., 59(2):163–7).

Folic Acid

Homocysteine increases as folic acid decreases in plasma of healthy men during short term dietary folic acid and methyl group restriction (Jacob et al., J. Nutr. 1994, 124(7) :1072–80). The possible association of folic acid deficiency with homocysteinemia was recently investigated. (Kang et. al., 1987, Metabolism 36; 458–462; Stabler, et. al., 1988, J. Clin. Invest. 81:466–74). They demonstrated a striking negative correlation between serum folic acid concentrations and protein-bound HCY. Moderate to severe homocysteinemia was observed in all subjects with serum folic acid concentrations of 4.5 nmol/1 and in the majority of subjects with low normal serum concentrations (4.5–8.8 nmol/1). HCY concentrations ranging from 17–185 mcmole/1 (normal 7–22) were observed in 18 of 19 folic acid deficient individuals. These findings provide a new biochemical test for the assessment of the folic acid nutritional status. The homocysteinemia was corrected by the oral addition of folic acid (1 mg/d) but reappeared 12 weeks after said addition was discontinued. Kang et. al.; 1988 (Metabolism 37:611–613) surprisingly found that a high proportion (20%) of coronary heart disease patients suffered from thermolabile methylene tetrahydro folic acid reductase. As a result of the half-life of the body folic acid seems to be shorter than normal as indicted by the rapid reappearance of homocysteinemia after discontinuation of the addition of folic acid. Thus, it seems that the homocysteine metabolism is dependent also on the presence of a suitable amount of Vit B12, folic acid and under certain circumstances of betaine.

These results support previous suggestions that increased plasma homocysteine concentrations provide a marker of functional folic acid deficiency and further indicate that individuals may differ greatly in their susceptibility to hyperhomocysteinemia due to low folate intakes.

Folic acid appears to be the most effective agent against hyperHCY as it reduced fasting levels even when given alone. Low folic acid status is most commonly caused by low dietary folic intake (Stampfer, et. al., 1995, N. Eng. J. Med., 332:328–329). 400 mcg of folic acid/day is required to level plasma HCY (Davis et. al., 1994, Faseb. J. 8:A248 Abstract). This requirement resulted in the public health proposal for folic acid fortification, i.e., addition to flour and grains at 350 mcg/100 g (Boushey, et. al., 1995, JAMA, 274:1049–1057).

The folic acid-Vit B12 required re-methylation of homocysteine to methionine normally converts ~50% of available homocysteine back to methionine. When this step is inhibited, either due to Vit B 12 deficiency or inborn faults of Vit 12 metabolism or folic acid metabolism, it was shown to elevate the concentration of circulating homocysteine to values thought to represent an important risk factor for the development of occlusive vascular disease (Baumgartner, et. al., 1980, J. Inherited Metab. Dis.: 101–103; Kang, et. al., 1986, U. Clin. Invest 77:1482–1486).

Vit B12

Vit B 12 alone is effective in lowering HCY levels in cases with overt cobalamine deficiency (Brattstrom et. al., 1990, Atherosclerosis, 18:51–60: Brattstrom et. al., 1988, Metabolism, 37:175–178; Lindenbaum et. al., 1988, N. Eng. J. Med. 818:1720–1729).

The close association between Vit B12 and HCY suggests that HCY is another indicator of intracellular cobalamine functions in adults and in youngsters (Schneede et. al., 1994, Pediatr. Res. 36(2): 194–201). Vit B12 deficiency in sheep caused lipid accumulation, peroxidation and decreased liver Vit E (Kennedy et. al. 1994, Int. J. Vitam. Nutr. Res., 64(4):270–6). These results suggest that the initiation of peroxidation is related to the increase in plasma homocysteine.

Magnesium

Recently it was found that magnesium is essential for the Vit B6 function as the enzyme pyridoxal phosphatase is activated by magnesium and inhibited by calcium (Fonda et. al. 1995, Arch. Biochem. Biophys. 320(2):345–52). The formation of S-adenosyl-methionine (SAM), via the methionine adenosyl transferase enzyme, which is the first step in the methionine metabolism, is dependent on the presence of an appropriate amount of magnesium. The SAM is formed by the transfer of the adenosyl group from adenosyl-triphosphate (ATP) to the sulfur atom of methionine. Recently it was suggested that SAM activates the cystathionine - B-synthase even under Vit B6 deficiency. This emphasizes the importance of the presence of magnesium in the high methionine metabolic environment (Miller et. al. 1992, Am. J. Clin. Nutr., 55:1154–1160). Milk products comprise generally a low amount of magnesium and the ratio methionine/magnesium is very high. Enriching the milk product with magnesium could contribute to facilitate the methionine metabolism.

The Technological Food Environment

Dairy Products

Dairy products are among the foods highest in methionine/VIT B6 ratio in low fat Ricotta, for example, the ratio methionine/Vit B6 is 14245:1 (mg/mg). In many beef varieties it is around 2000 and in many cereals it is around 500. Regarding the RDA (recommended daily allowance) 1 cup (226 g) of low fat cottage cheese 2% contains 934 mg of methionine, which corresponds to about 200% of the RDA but only 0.172 mg of Vit B6 which is 8.6% of the RDA. In this case the ratio methionine:Vit B6 is 5430. At the same time, the concentrations of folic acid and magnesium are proportionally quite low, i.e. one cup of low fat 2% cottage cheese contains 16% and 4% of the RDA for folic acid and magnesium, respectively. Here, the methionine concentration (as % of RDA) is 20, 13, and 50 times higher than that of the above metabolic cofactors, respectively.

Casein

Research studies showed that the presence of casein rendered the diet much more atherogenic and cholesterolemic than soy protein or flour (Howard et. al., 1965, Atherosclerosis Res. J. :330–337). Plasma cholesterol concentrations were doubled in rabbits fed on casein based cholesterol free diets 3.23 mmol/1 compared to 1.37 and 1.66 following soy protein and basal diets, respectively. (Meeker et. al. 1940, 1941, cited in Kritchevsky, 1995, J. Nutr. 125:589S–593S.) The authors attributed the difference to the amino acid composition of the individual proteins. Kritchevsky et. al. 1959, Arch. Biochem. Biophys., 85:444–451)) examined the effects of casein and of soy protein in conventional and germ free chickens. The casein-containing diet was more cholesterolemia in every case.

Whey

Compared with the casein fraction in milk, in Whey-Acid-Dry the proportions of the cofactors are much better: in 100 g of whey (345Kc) of 49% RDA of methionine and 39, 19, 124 and 74% of RDA for Vit B6, folic acid, Vit B12 and magnesium, respectively.

Human milk has a much higher whey:casein ratio than cows milk. Increasing the ratio of the Whey fraction is the basic step for converting cows milk ingredients into humanized infant milk formula.

Low amounts of cysteine are part of the risks related to improper methionine and homocysteine metabolism and/or hyperhomo-cysteinemia.

Human milk as other initial foods, e.g. eggs and wheat germ, comprises a high proportion of cystine, i.e. the ratio methionine:cystine for wheat germ is 1.0 and for eggs 1.3. Compared to 3.3 in low fat, 2% cottage cheese; 2.4 for cream cheese (35 % fat); and 3.2 for low fat yoghurt.

Deficiencies Related to Processing

Vit B6

Vit B6 is water-soluble. It is very sensitive. Processing can result in considerable loss of its activity: 15 to 70% in freezing fruits and vegetables; 50% to 70% in processing meats, 50% to 90% in milling grain.

Folic Acid

Folic acid is water soluble, is easily destroyed by cooking, and is susceptible to degradation by processing and canning of vegetables and refining of grains.

Vit B12

Vit B12 is relatively stable in heat and light. It is stored to some degree in liver, kidney, lungs and spleen. Thus, it can be balanced easier, and not all the required amount has to be eaten every day.

Cysteine

A further advantage of human milk resides in the fact that it comprises a larger amount of cysteine. Whereas in human milk the ratio of methionine to cystine is 1:1, in cow's milk it is 3:1. Cysteine is a very crucial amino acid involved in the production of glutathione, which is a main factor in the detoxification and antioxidative systems. Glutathione, a cysteine-containing tripeptide, is the most abundant non-protein thiol in mammal cells. Glutathione plays an important role in the detoxification of xenobiotic compounds and in the antioxidation of reactive oxygen species and free radicals. Its major function and involvement in diseases explain how dietary changes for increasing its concentration is important (Bray et. al., 1993, Can J. Physiol. Pharmacol. 71(9):46–51). The supply of glutathione for detoxification purposes may be reduced by the supply of intracellular cysteine to serve as a precursor for glutathione synthesis through the gamma glutamyl cycle (Smith et. al., 1991, Adv. Exp. Med. Biol. 289:165–9.

When sulfur amino acids effects on blood lipids were compared in rats, serum lipid values were greater on proteins supplemented with methionine, while the addition of cysteine produced lower lipid levels (Kis, 1990, Plant Foods Hum. Nutr. 1990 40(4):297–308). A recent research showed that animal proteins, such as casein, are more hypercholesterolemic than soy protein, interpreted as mainly due to the presence of lysine and methionine. The effect was more pronounced in hypercholesterolemics (Carroll et. al., 1995, J. Nutr. 125 (3 supplement):594S–597S).

It is thus desirable to produce food products, and particularly dairy products, in which the amounts of the cofactors of the methionine metabolism, in particular of Vit B6, and optionally of magnesium, folic acid, Vit B12, and cysteine, are increased, thereby reducing the ratio of methionine to these cofactors. The present invention thus consists in variety of foods and/or dairy products in which the ratio methionine: Vit B6 (mg/mg) is reduced to below the starting (or base) methionine:vit B6 ratio, preferably reduced to a ratio of 100–3000:1, more preferably to 300–2000, most preferably to 450–1000:1. Especially preferred are products where the ratio of methionine: Vit B6 is reduced to 100–1400:1, preferably 300–600:1, and advantageously 340–400:1.

The present invention will now be illustrated with reference to the following examples without being limited to them. The examples present the suggested concentrations of Vitamins B6 and B12, folic acid, magnesium and cysteine. The marked figures represent firstly the original/endogenic concentration and then a final representative concentration.

The amounts to be added are complementary to the original concentrations. Thus, the added amount will be calculated by substraction of the original content from the final desired value. The percentages represent the values as % of the Israeli RDA for adult males (50–70).

When designing a Vit B6 enriched dairy product when the methionine analysis is not clear, the calculation will be performed in such a manner that the values are added for each ingredient.

| ORIGINAL CONCENTRATION | FINAL CONCENTRATIONS | |
|---|---|---|
| Example 1 CHEESE COTTAGE LOWFAT-1%-1/2 CUP 113 G. | | |
| KCAL-82 KC-4% | | |
| PROTEIN-14 g-28% | | |
| CARBOHYDRATE-3 G-1% | | |
| FAT-1.1 G-2% | | |
| Vit B6-0,077 MG-3.85% | 0.54 MG | 27% |
| FOLIC ACID-0.014 MG-7% | 0.047 MG | 23% |
| Vit B12-0.72 MCG-36% | | |
| CALCIUM-69 MG-9% | | |
| MAGNESIUM-6 MG-1.7% | 80 MG | 23% |
| METHIONINE-422 MG-79% | | |
| CYSTINE-130 MG-24% | | |
| Example 2 MILK 1% LOW-FAT-FLUID 1 CUP 244 G | | |
| KCAL-102 KC-5% | | |
| PROTEIN-8 G-16% | | |
| CARBOHYDRATE-11.7 G-4% | | |
| FAT-2.6 G-7% | | |
| Vit B6-0.105 MG-5.3% | 0.36 MG | 18% |
| FOLIC ACID-0.012 MG-6% | 0.056 MG | 28% |
| Vit B12-0.9 MG-45% | | |
| CALCIUM-300 MG-37% | | |
| MAGNESIUM-34 MG-9.7% | 87.5 MG | 25% |
| METHIONINE-201 MG-38% | | |
| CYSTINE-74 MG-14% | | |
| Example 3 CHEESE-CREAM 1 OUNCE 28.35 G | | |
| KCAL-99.8 KC-5% | | |
| PROTEIN-2.17 G-4% | | |
| CARBOHYDRATE-0.8 G-0% | | |
| FAT-9.98 G-14% | | |
| Vit B6-0.013 MG-0.65% | 0.06 MG | 3% |
| FOLIC ACID-0.004 MG-2% | 0.006 MG | 3% |
| Vit B12-0.12 MCG-6% | | |
| CALCIUM-23.26 MG-3% | | |
| MAGNESIUM-2.0 MG-0.6% | 14 MG | 4% |
| METHIONINE-51.5 MG-9.7% | | |
| CYSTINE-19.2 MG-3.5% | | |
| Example 4 MILK CHOCOLATE-1% LOWFAT 1 CUP 250 G | | |
| KCAL-158 KC-7% | | |
| PROTEIN-8.1 G-16% | | |
| CARBOHYDRATE-26 G-9% | | |
| FAT-2.5 G-3% | | |
| Vit B6-0.1 MG-5% | 0.36 MG | 18% |
| FOLIC ACID-0.012 MG-6% | 0.046 MG | 23% |
| Vit B12-0.855 MCG-43% | | |
| CALCIUM-287 MG-36% | | |
| MAGNESIUM-33 MG-9.4% | 98 MG | 28% |
| METHIONINE-203 MG-38% | | |
| CYSTINE-75 MG-14% | | |
| Example 5 YOGURT-PLAIN-LOWFAT 1 CUP 227 G | | |
| KCAL-144 KC-7% | | |
| PROTEIN-11.9 G-24% | | |
| CARBOHYDRATE-16 G-6% | | |
| FAT-3.6 G-5% | | |
| Vit B6-0.11 MG-5.5% | 0.036 MG | 18% |

| ORIGINAL CONCENTRATION | FINAL CONCENTRATIONS | | ORIGINAL CONCENTRATION | FINAL CONCENTRATIONS | |
|---|---|---|---|---|---|
| FOLIC ACID-0.025 MG-12.5% | 0.050 MG | 25% | Example 9 | | |
| Vit B12-1.28 MCG-64% | | | MILK CHOCOLATE WHOLE 1 CUP 250 G | | |
| CALCIUM-415 MG-52% | | | | | |
| MAGNESIUM-40 MG-11.4% | 88 MG | 25% | KCAL-208-9% | | |
| METHIONINE-351 MG-65% | | | PROTEIN-7.9 G-14% | | |
| CYSTINE-109 MG-20% | | | CARBOHYDRATE-25.9 GG-?% | | |
| Example 6 | | | FAT-48 G-12% | | |
| CHEESE-COTTAGE WITH FRUIT 1/4 CUP 56 G | | | Vit B6-0.1 MG-5% | 0.5 MG | 25% |
| | | | FOLIC ACID-0.012 MG-6% | | |
| KCAL-69.8 KC-3% | | | Vit B12-0.835 MG-42% | | |
| PROTEIN-5.6 G-11% | | | CALCIUM-280 MG-35% | | |
| CARBOHYDRATE-7.5 G-3% | | | MAGNESIUM-33 MG-9.4% | | |
| FAT-1.9 C-3% | | | METHIONINE-199 MG-37% | | |
| Vit B6-0.03 MG-1.5% | 0.36 MG | 18% | CYSTINE-73 MG-13.6% | | |
| FOLIC ACID-0.0055 MG-2.75% | 0.046 MG | 23% | Example 10 | | |
| Vit B12-0.28 MCG-14% | 0.36 MCG | 18% | YOGURT-PLAIN-WHOLE 1 CUP 227 G | | |
| CALCIUM-27 MG-3% | | | | | |
| MAGNESIUM-2.25 MG-0.6% | 87.5 MG | 25% | KCAL-139 KC-6% | | |
| METHIONINE-168 MG-31% | | | PROTEIN-7.88 G-16% | | |
| CYSTINE-51.8-9.7% | | | CARBOHYDRATE-10.6 g-4% | | |
| Example 7 | | | FAT-7.38 g-10% | | |
| CREAM-SOUR-CULTURED 1 CUP 230 G | | | Vit B6_0.073 MG-3.65% | 0.036 MG | 18% |
| | | | FOLIC ACID-0.017 MG-8.5% | | |
| CKAL-493 KC-22% | | | Vit B12-0.844 MCG-42% | | |
| PROTEIN-7.27 G-15% | | | CALCIUM-274 MG-34% | | |
| CARBOHYDRATE-9.8 G-4% | | | MAGNESIUM-26 MG-9% | | |
| FAT-48 G-66% | | | METHIONINE-232 MG-43% | | |
| Vit. B6-0.037 MG-1.9% | 0.46 MG | 18% | CYSTINE-72.6 MG-13.5% | | |
| FOLIC ACID-0.025 MG-12.5% | 0.44 MG | 22% | Example 11 | | |
| Vit B12-0.69 MCG-35% | | | CHEESE RICOTTA SKIM MILK 1 CUP 246 G | | |
| CALCIUM-268 MG-33% | | | | | |
| MAGNESIUM-26 MG-7.4% | 87.5 MG | 25% | KCAL-340 KC-5% | | |
| METHIONINE-184 MG-34% | | | PROTEIN-28. G-56% | | |
| CYSTINE-66.7 MG-12% | | | CARBOHYDRATE-12 G-5% | | |
| Example 8 | | | FAT-19.6 G-27% | | |
| CHEESE-AMERICAN PROCESSED | | | Vit B6-0.049 MG-2.5% | 2.0 MG | 100% |
| | | | FOLIC ACID-0.032 MG-16% | | |
| CKAL-106 KC-5% | | | Vit B12-0.716 MCG-36% | | |
| PROTEIN-6.27 G-13% | | | CALCIUM-669 MG-84% | | |
| CARBOHYDRATE-0.45 G-0% | | | MAGNESIUM-36 MG-10% | | |
| FAT-8.8 G-12% | | | METHIONINE-698 MG-130% | | |
| Vit B6-0.02 MG-1% | 0.44 MG | 22% | CYSTINE-246 MG-46% | | |
| FOLIC ACID-0.002 MG-1% | 0.050 MG | 25% | | | |
| Vit B12-0.2 MCG-10% | 0.50 MCG | 25% | | | |
| CALCIUM-174 MG-22% | | | | | |
| MAGNESIUM-6 MG-2% | 77 MG | 22% | | | |
| METHIONINE-162 MG-30% | | | | | |
| CYSTINE-40 MG-7% | | | | | |

The invention according to additional food products is exemplified below.

EXAMPLE 12

A: ENRICHMENT WITHIN COMPOSITION
3205 - CHICK-DRUMSTK-NT ONLY STWED

| | SERVING SIZE 1 ITEM 46 g | | | % OF RDA | RATIO METHIONINE TO: | ADDED | RESULT RATIO | ADDED | RESULT RATIO |
|---|---|---|---|---|---|---|---|---|---|
| Kilocalories | kc | | 78.00 | 4 | | | | | |
| Protein | g | | 12.70 | 25 | | | | | |
| Fat | g | | 2630 | 4 | | | | | |
| Methionine | mg | | 350 | 82 | | | | | |
| Vitamin B6 | mg | | 0.100 | 6 | 3500.0 | 0.2 (10%) | 1167 | 0.5 (25%) | 583 |
| Folate | ug | | 4.000 | 2 | 87.5 | 20 (10%) | 14.6 | 50 g (25%) | 6.48 |
| Vitamin B12 | ug | | 0.110 | 6 | | | | | |
| Magnesium | mg | | 10.00 | 4 | 35.0 | 35 (10%) | 7.78 | — | — |

EXAMPLE 13

B: ENRICHMENT BY EXTERNAL APPLICATION OF ENRICHED SAUCE
3205 - CHICK-DRUMSTK-NT ONLY STWED

| SERVING SIZE 1 ITEM 46 g | | | % OF RDA | RATIO METHIONINE TO: | ADDED | RESULT RATIO | ADDED | RESULT RATIO |
|---|---|---|---|---|---|---|---|---|
| Kilocalories | kc | 78.00 | 4 | | | | | |
| Protein | g | 12.70 | 25 | | | | | |
| Fat | g | 2630 | 4 | | | | | |
| Methionine | mg | 350 | 82 | | | | | |
| Vitamin B6 | mg | 0.100 | 6 | 3500 | | | | |
| Folate | ug | 4.000 | 2 | 87.5 | | | | |
| Vitamin B12 | ug | 0.110 | 6 | | | | | |
| Magnesium | mg | 10.00 | 4 | 35 | | | | |

2246 - HOT MUSTARD SAUCE

| SERVING SIZE 1 ITEM 30 g | | | % OF RDA | RATIO METHIONINE TO: | ADDED | RESULT RATIO | ADDED | RESULT RATIO |
|---|---|---|---|---|---|---|---|---|
| Kilocalories | kc | 70.00 | 3 | | | | | |
| Protein | g | 0.500 | 1 | | | | | |
| Fat | g | 3.600 | 5 | | | | | |
| Methionine | mg | no data | no data | | 0.2 (10%) | | 0.5 (25%) | |
| Vitamin B6 | mg | no data | no data | | 20 (10%) | | 50 g (25%) | |
| Folate | ug | no data | no data | | | | | |
| Vitamin B12 | ug | no data | no data | | 35 (10%) | | | |
| Magnesium | mg | no data | no data | 35 (10%) | | | | |

3205 + 2246 - THE COMBINATION OF CHICK-DRUMSTK-NT ONLY STWD + ENRICHED HOT MUSTARD SAUCE

| SERVING SIZE 1 ITEM 46 g 1 SERVING 30 g | | | % OF RDA | RATIO METHIONINE TO: | ADDED | RESULT RATIO | ADDED | RESULT RATIO |
|---|---|---|---|---|---|---|---|---|
| Kilocalories | kc | 148.00 | 7 | | | | | |
| Protein | g | 13.20 | 26 | | | | | |
| Fat | g | 6.230 | 8 | | | | | |
| Methionine | mg | 350 | 82 | | | | | |
| Vitamin B6 | mg | 0.100 | 6 | 3500 | 0.2 mg/30 ml (0.66 mg/100 ml) | 1167 | 0.5 mg/30 ml (1.66 mg/100 ml) | 583.3 |
| Folate | ug | 4.000 | 2 | 87.5 | 20 ug/30 ml (66 ug/100 ml) | 14.6 | 50 ug/30 ml (166 ug/100 ml) | 6.48 |
| Vitamin B12 | ug | 0.110 | 6 | | | | | |
| Magnesium | mg | 10.00 | 4 | 35 | 35 mg/30 ml (116 100 ml) | 7.78 | | |

EXAMPLE 14

Example: MODIFICATION WITHIN 100–3000 RANGE
3199 - CHICK-BREAST-MEAT ONLY STWD
A: ORIGINAL COMPOSITION

| SERVING SIZE 1 ITEM 190 g | | | % OF RDA | RATIO METHIONINE TO: | ADDED | RESULT RATIO | ADDED | RESULT RATIO |
|---|---|---|---|---|---|---|---|---|
| Kilocalories | kc | 288 | 10 | | | | | |
| Protein | g | 55.00 | 87 | | | | | |
| Fat | g | 5.760 | 6 | | | | | |
| Methionine | mg | 1524 | 284 | | | | | |
| Vitamin B6 | mg | 0.640 | 32 | 2381.25 | | | | |
| Folate | ug | 6.000 | 3 | 254.0 | | | | |
| Vitamin B12 | ug | 0.440 | 22 | | | | | |
| Magnesium | mg | 44.00 | 13 | 34.636 | | | | |

1128 - SAUCE-TOMATO-MUSHROOM-CAN
B: ENRICHING A COMPATIBLE SAUCE

| SERVING SIZE 1 CUP 245 g | | | % OF RDA | RATIO METHIONINE TO: | ADDED | RESULT RATIO | ADDED | RESULT RATIO |
|---|---|---|---|---|---|---|---|---|
| Kilocalories | kc | 85.80 | 4 | | | | | |
| Protein | g | 3.550 | 7 | | | | | |

EXAMPLE 14-continued

| | | | | | | | | | |
|---|---|---|---|---|---|---|---|---|---|
| Fat | g | 0.319 | — | | | | | | |
| Methionine | mg | 34.30 | 8 | | | | | | |
| Vitamin B6 | mg | 0.326 | 20 | 105.2 | 0.75 | 34 | 1.5 | 18.8 | |
| Folate | ug | 23.00 | 13 | 1.49 | 0.75 | 0.35 | 100 | 0.28 | |
| Vitamin B12 | ug | — | — | — | | | | | |
| Magnesium | mg | 46.60 | 17 | 0.736 | | | | | |

3199 + 1128 - THE COMBINATION OF CHICK-BREAST-MEAT ONLY STWD + ENRICHED SAUCE-TOMATO-MUSHROOM-CAN

| SERVING SIZE 1 ITEM 190 g 1 CUP 245 g | | | % OF RDA | RATIO METHIONINE TO: | ADDED | RESULT RATIO | ADDED | RESULT RATIO |
|---|---|---|---|---|---|---|---|---|
| Kilocalories | kc | 374 | 17 | | | | | |
| Protein | g | 58.55 | 117 | | | | | |
| Fat | g | 6.079 | 8 | | | | | |
| Methionine | mg | 1558 | 367 | | | | | |
| Vitamin B6 | mg | 0.966 | 60 | 1622.9 | 0.75 | 907 | 1.5 | 638 |
| Folate | ug | 29.00 | 16 | 53.72 | 75 | 15.0 | 100 | 12.0 |
| Vitamin B12 | ug | 0.440 | 22 | | | | | |
| Magnesium | mg | 90.60 | 32 | 17.196 | | — | | — |

EXAMPLE 15

1274 - CHICKEN-BREAST-STEWED

| SERVING SIZE 1 ITEM 220 g | | | % OF RDA | RATIO METHIONINE TO: | ADDED | RESULT RATIO | ADDED | RESULT RATIO |
|---|---|---|---|---|---|---|---|---|
| Kilocalories | kc | 404 | 18 | | | | | |
| Protein | g | 60.30 | 121 | | | | | |
| Fat | g | 16.30 | 22 | | | | | |
| Methionine | mg | 16.30 | 384 | | | | | |
| Vitamin B6 | mg | 0.640 | 40 | 2546.87 | | | | |
| Folate | ug | 6.000 | 3 | 271.666 | | | | |
| Vitamin B12 | ug | 0.460 | 23 | | | | | |
| Magnesium | mg | 48.00 | 17 | 33.958 | | | | |

1815 - SAUCE-SOY TAMARI

| SERVING SIZE 5 TBSP/D 90 g | | | % OF RDA | RATIO METHIONINE TO: | ADDED | RESULT RATIO | ADDED | RESULT RATIO |
|---|---|---|---|---|---|---|---|---|
| Kilocalories | kc | 54.00 | 2 | | | | | |
| Protein | g | 9.450 | 15 | | | | | |
| Fat | g | 0.090 | — | | | | | |
| Methionine | mg | 151 | 28 | | | | | |
| Vitamin B6 | mg | 0.180 | 9 | 838.88 | 0.2 mg (10%) | 397 | 0.5 mg (25%) | 222 |
| Folate | ug | 16.40 | 8 | 9.207 | 20 ug (10%) | 4.14 | 50 ug (25%) | 2.27 |
| Vitamin B12 | ug | — | — | | | | | |
| Magnesium | mg | 36.00 | 10 | 4.1944 | | | | |

1274 + 1815 - THE COMBINATION OF CHICKEN-BREAST - STEWED + ENRICHED SAUCE-SOY-TAMARI

| SERVING SIZE 1 ITEM 220 g 5 TBSP/D 90 g | | | % OF RDA | RATIO METHIONINE TO: | ADDED | RESULT RATIO | ADDED | RESULT RATIO |
|---|---|---|---|---|---|---|---|---|
| Kilocalories | kc | 458.00 | 16 | | | | | |
| Protein | g | 69.75 | 111 | | | | | |
| Fat | g | 16.39 | 17 | | | | | |
| Methionine | mg | 1780 | 332 | | | | | |
| Vitamin B6 | mg | 0.820 | 41 | 2170.73 | 0.2 mg (10%) | 1754 | 0.5 mg (25%) | 1348 |
| Folate | ug | 22.40 | 11 | 79.464 | 20 ug (10%) | 40.4 | 50 ug (25%) | 24.6 |
| Vitamin B12 | ug | 0.460 | 23 | | | | | |
| Magnesium | mg | 84.00 | 24 | 21.190 | | | | |

EXAMPLE 16

918 - EGG SUBSTITUTE - LIQUID

| SERVING SIZE 1 CUP 251 G | | | % OF RDA | RATIO METHIONINE TO: | ADDED | RESULT RATIO | ADDED | RESULT RATIO |
|---|---|---|---|---|---|---|---|---|
| Kilocalories | kc | 211 | 10 | | | | | |
| Protein | g | 30.1 | 60 | | | | | |
| Fat | g | 8.3 | 11 | | | | | |
| Methionine | mg | 1067 | 251 | | | | | |
| Vitamin B6 | mg | 0.008 | 1 | 133.4 | 0.5 (25%) | 2134 | 1.0 (50%) | 1067 |
| Folate | ug | 37.4 | 21 | 28.5 | 50 ug (25%) | 12 | — | — |
| Vitamin B12 | ug | 0.748 | 37 | | | | | |
| Magnesium | mg | 21.9 | 8 | 48.7 | 35 (10%) | 18.7 | 87.5 (25%) | 9.9 |

EXAMPLE 17

ENRICHMENT BY EXTERNAL DRESSING
159-FISH-TUNA/CAN OIL - DRAINED
A. ORIGINAL COMPOSITION

| SERVING SIZE 1 SERVING 85 g | | | % OF RDA | RATIO METHIONINE TO: | ADDED | RESULT RATIO | ADDED | RESULT RATIO |
|---|---|---|---|---|---|---|---|---|
| Kilocalories | kc | 168.00 | 6 | | | | | |
| Protein | g | 24.80 | 39 | | | | | |
| Fat | g | 6.980 | 7 | | | | | |
| Methionine | mg | 733 | 137 | | | | | |
| Vitamin B6 | mg | 0.094 | 5 | 7797.9 | | | | |
| Folate | ug | 4.510 | 2 | 162.52 | | | | |
| Vitamin B12 | ug | 1.870 | 94 | 478.9 | | | | |
| Magnesium | mg | 26.40 | 8 | 27.765 | | | | |

941 - SAL DRESS-SESAME SEED
B. ENRICHING A COMPATABLE DRESSING

| SERVING SIZE - 3 TBSP - 45 g | | | % OF RDA | RATIO METHIONINE TO: | ADDED | RESULT RATIO | ADDED | RESULT RATIO |
|---|---|---|---|---|---|---|---|---|
| Kilocalories | kc | 203 | 9 | | | | | |
| Protein | g | 1500 | 3 | | | | | |
| Fat | g | 20.70 | 7 | | | | | |
| Methionine | mg | 13.32 | 3 | | | | | |
| Vitamin B6 | mg | — | — | — | 1 mg/100 ml (25%) | | | |
| Folate | ug | — | — | — | 100 ug/100 ml | | | |
| Vitamin B12 | ug | — | — | — | | | | |
| Magnesium | mg | 0.000 | — | — | 70 mg/100 ml | | — | — |

159 + 941 - THE COMBINATION OF TUNA FISH* + ENRICHED SAL DRESS SESAM SEED

| SERVING SIZE 85 g FISH + 45 g SAL-DRESS | | | % OF RDA | RATIO METHIONINE TO: | ADDED | RESULT RATIO | ADDED | RESULT RATIO |
|---|---|---|---|---|---|---|---|---|
| Kilocalories | kc | 371 | 17 | | | | | |
| Protein | g | 26.30 | 53 | | | | | |
| Fat | g | 27.68 | 38 | | | | | |
| Methionine | mg | 746 | 176 | | | | | |
| Vitamin B6 | mg | 0.094 | 6 | 7936 | 0.45 mg | 1371 | | |
| Folate | ug | 4.510 | 3 | 165 | 45 ug | 15.0 | | |
| Vitamin B12 | ug | 1.870 | 94 | | | | | |
| Magnesium | mg | 26.40 | 9 | 28 | 31.5 mg | 12.9 | | |

*Generic composition

EXAMPLE 18

1596 - FISH - SALMON PATTY

| SERVING SIZE 1 SERVING 100 g | | | % OF RDA | RATIO METHIONINE TO: | ADDED | RESULT RATIO | ADDED | RESULT RATIO |
|---|---|---|---|---|---|---|---|---|
| Kilocalories | kc | 239 | 8 | | | | | |
| Protein | g | 15.8 | 25 | | | | | |
| Fat | g | 12.4 | 13 | | | | | |
| Methionine | mg | 783 | 146 | | | | | |
| Vitamin B6 | mg | 0.07 | 4 | 11186 | 0.2 mg (10%) | 2900 | 0.5 mg (25%) | 1374 |
| Folate | ug | 13.0 | 7 | 60.23 | 26 | 20 | — | — |
| Vitamin B12 | ug | 3.000 | 150 | | | | | |
| Magnesium | mg | 34.00 | 10 | 23.029 | 10 | 17.8 | — | — |

EXAMPLE 19

149 - FISH STICKS - BREAD FROZ-COOK

| SERVING SIZE 1 OUNCE 28.350 g | | | % OF RDA | RATIO METHIONINE TO: | ADDED | RESULT RATIO | ADDED | RESULT RATIO |
|---|---|---|---|---|---|---|---|---|
| Kilocalories | kc | 77.06 | 3 | | | | | |
| Protein | g | 4.432 | 7 | | | | | |
| Fat | g | 3.464 | 4 | | | | | |
| Methionine | mg | 120 | 22 | | | | | |
| Vitamin B6 | mg | 0.017 | 1 | 7058.8 | 0.023 | 3000 | 0.063 | 1500 |
| Folate | ug | 5.161 | 3 | 23.25 | | | | |
| Vitamin B12 | ug | 0.509 | 25 | | | | | |
| Magnesium | mg | 7.088 | 2 | 16.930 | | | | |

EXAMPLE 20

1840 - FISH - SURIMI

| SERVING SIZE - 1 SERVING 100 g | | | % OF RDA | RATIO METHIONINE TO: | ADDED | RESULT RATIO | ADDED | RESULT RATIO |
|---|---|---|---|---|---|---|---|---|
| Kilocalories | kc | 84.20 | 3 | | | | | |
| Protein | g | 12.90 | 20 | | | | | |
| Fat | g | 0.765 | 1 | | | | | |
| Methionine | mg | 438 | 82 | | | | | |
| Vitamin B6 | mg | 0.026 | 1 | 16846.1 | 0.12 | 3000 | 0.26 | 1531 |
| Folate | ug | 1.360 | 1 | 322.058 | 2.3 | 18.0 | — | — |
| Vitamin B12 | ug | 1.360 | 68 | | | | | |
| Magnesium | mg | 36.60 | 10 | 11.967 | — | — | — | — |

EXAMPLE 21

1325 - POLISH SAUSAGE - PORK

| SERVING SIZE 1 ITEM 227 g | | | % OF RDA | RATIO METHIONINE TO: | ADDED | RESULT RATIO | ADDED | RESULT RATIO |
|---|---|---|---|---|---|---|---|---|
| Kilocalories | kc | 740 | 26 | | | | | |
| Protein | g | 32.00 | 51 | | | | | |
| Fat | g | 65.20 | 67 | | | | | |
| Methionine | mg | 860 | 160 | | | | | |
| Vitamin B6 | mg | 0.420 | 21 | 2047.6 | 0.15 | 1508 | | |
| Folate | ug | 4.540 | 2 | 189.427 | 4.5 | 18.4 | | |
| Vitamin B12 | ug | 2.230 | 111 | | | | | |
| Magnesium | mg | 32.00 | 9 | 26.875 | — | — | | |

EXAMPLE 22

1883 - HAMBURGER - GROUND - REG - FRIED

| SERVING SIZE 1 SERVING/D 85 g | | | % OF RDA | RATIO METHIONINE TO: | ADDED | RESULT RATIO | ADDED | RESULT RATIO |
|---|---|---|---|---|---|---|---|---|
| Kilocalories | kc | 260 | 9 | | | | | |
| Protein | g | 20.30 | 32 | | | | | |
| Fat | g | 19.20 | 20 | | | | | |
| Methionine | mg | 520 | 97 | | | | | |
| Vitamin B6 | mg | 0.204 | 10 | 2549.02 | 0.15 | 1469 | — | — |
| Folate | ug | 7650 | 4 | 67.974 | 45 | 9.9 | — | — |
| Vitamin B12 | ug | 2300 | 115 | | | | | |
| Magnesium | mg | 17.00 | 5 | 30.588 | 18 | 14.9 | — | — |

EXAMPLE 23

1331 - COREND BEEF LOAF - JELLIED

| SERVING SIZE 1 SLICE 28.4 g | | | % OF RDA | RATIO METHIONINE TO: | ADDED | RESULT RATIO | ADDED | RESULT RATIO |
|---|---|---|---|---|---|---|---|---|
| Kilocalories | kc | 43.50 | 2 | | | | | |
| Protein | g | 6.500 | 10 | | | | | |
| Fat | g | 1700 | 2 | | | | | |
| Methionine | mg | 143 | 27 | | | | | |
| Vitamin B6 | mg | 0.034 | 2 | 4205.88 | 0.014 | 2979 | — | — |
| Folate | ug | 2.27 | 1 | 62.9 | 5.68 | 18.0 | — | — |
| Vitamin B12 | ug | 0.360 | 18 | | | | | |
| Magnesium | mg | 3.000 | 1 | 47.666 | 4.0 | 20 | — | — |

EXAMPLE 24

3302 - LAMB - GROUND - CKD - BROILED

| SERVING SIZE 1 SERVING 85 g | | | % OF RDA | RATIO METHIONINE TO: | ADDED | RESULT RATIO | ADDED | RESULT RATIO |
|---|---|---|---|---|---|---|---|---|
| Kilocalories | kc | 240 | 8 | | | | | |
| Protein | g | 21.00 | 33 | | | | | |
| Fat | g | 16.70 | 17 | | | | | |
| Methionine | mg | 540 | 101 | | | | | |
| Vitamin B6 | mg | 0.120 | 6 | 4500 | 0.08 | 2701 | 0.33 | 1200 |
| Folate | ug | 16.00 | 8 | 33.75 | 34 | 10.8 | — | — |
| Vitamin B12 | ug | 2.220 | 111 | | | | | |
| Magnesium | mg | 21.00 | 6 | 25.714 | 9 | 18 | — | — |

EXAMPLE 25

202 - FRANKFURTER - HOT DOG - NO BUN

| SERVING SIZE 1 ITEM 57 g | | | % OF RDA | RATIO METHIONINE TO: | ADDED | RESULT RATIO | ADDED | RESULT RATIO |
|---|---|---|---|---|---|---|---|---|
| Kilocalories | kc | 183 | 6 | | | | | |
| Protein | g | 6.430 | 10 | | | | | |
| Fat | g | 16.60 | 17 | | | | | |
| Methionine | mg | 130 | 24 | | | | | |
| Vitamin B6 | mg | 0.080 | 4 | 1625.0 | 0.023 | 1262 | — | — |
| Folate | ug | 2000 | 1 | 65.0 | 5.2 | 18 | — | — |
| Vitamin B12 | ug | 0740 | 37 | | | | | |
| Magnesium | mg | 6000 | 2 | 21.666 | | | | |

EXAMPLE 26

(12) - CHEESE - MOZZARELLA - WHL MILK
A: ENRICHMENT WITHIN THE PRODUCT COMPOSITION

| SERVING SIZE 1 OUNCE 28.35 g | | | % OF RDA | RATIO METHIONINE TO: | ADDED | RESULT RATIO | ADDED | RESULT RATIO |
|---|---|---|---|---|---|---|---|---|
| Kilocalories | kc | 79.86 | 3 | | | | | |
| Protein | g | 5.5 | 9 | | | | | |
| Fat | g | 6.109 | 6 | | | | | |
| Methionine | mg | 154 | 29 | | | | | |
| Vitamin B6 | mg | 0.016 | 1 | 9625 | 0.05 | 2333 | 0.2 | 712 |
| Folate | ug | 1.996 | 1 | 77.154 | 10 ug | 7.7 | — | — |
| Vitamin B12 | ug | 0.185 | 9 | 832.43 | | | | |
| Magnesium | mg | 4.991 | 1 | 30.855 | 5.5 | 14.7 | | |

EXAMPLE 27

(18) - CHEESE - RICOTTA - WHOLE MILK

| SERVING SIZE 1 ITEM 246 g | | | % OF RDA | RATIO METHIONINE TO: | ADDED | RESULT RATIO | ADDED | RESULT RATIO |
|---|---|---|---|---|---|---|---|---|
| Kilocalories | kc | 428 | 15 | | | | | |
| Protein | g | 27.0 | 44 | | | | | |
| Fat | g | 31.9 | 33 | | | | | |
| Methionine | mg | 690 | 129 | | | | | |
| Vitamin B6 | mg | 0.106 | 5 | 6509.4 | 0.142 | 2851 | 0.6 | 977 |
| Folate | ug | 30.00 | 15 | 23 | 28.3 | 11.8 | 56.7 | 8.0 |
| Vitamin B12 | ug | 0.831 | 42 | 830.32 | | | | |
| Magnesium | mg | 28.00 | 8 | 24.643 | | | | |

EXAMPLE 28

(21) - CHEESE SWISS

| SERVING SIZE 1 OUNCE 28.35 g | | | % OF RDA | RATIO METHIONINE TO: | ADDED | RESULT RATIO | ADDED | RESULT RATIO |
|---|---|---|---|---|---|---|---|---|
| Kilocalories | kc | 107 | 4 | | | | | |
| Protein | g | 8.046 | 13 | | | | | |
| Fat | g | 7.766 | 8 | | | | | |
| Methionine | mg | 222 | 41 | | | | | |
| Vitamin B6 | mg | 0.024 | 1 | 9250 | 0.075 | 2220 | 0.150 | 1276 |
| Folate | ug | 1.996 | 1 | 111.22 | 9.0 | 20.2 | 20.0 | 10.0 |
| Vitamin B12 | ug | 0.474 | 24 | 468.35 | | | | |
| Magnesium | mg | 10.08 | 3 | 22.019 | | | | |

EXAMPLE 29

(11) - CHEESE - CREAM

| SERVING SIZE 1 OUNCE 28.35 g | | | % OF RDA | RATIO METHIONINE TO: | ADDED | RESULT RATIO | ADDED | RESULT RATIO |
|---|---|---|---|---|---|---|---|---|
| Kilocalories | kc | 99.82 | 3 | | | | | |
| Protein | g | 2.166 | 3 | | | | | |
| Fat | g | 9.982 | 10 | | | | | |
| Methionine | mg | 51.509 | 10 | | | | | |
| Viiamin B6 | mg | 0.013 | 1 | 3962.23 | 0.02 | 1619 | 0.05 | 817 |
| Folate | ug | 4.043 | 2 | 12.740 | — | — | — | — |
| Vitamm B12 | ug | 0.122 | 6 | 422.205 | | | | |
| Magnesium | mg | 2.026 | 1 | 25.423 | | | | |

EXAMPLE 30

(10) - CHEESE - COTTAGE - UNCREAMED

| SERVING SIZE 1 CUP 145 g | | | % OF RDA | RATIO METHIONINE TO: | ADDED | RESULT RATIO | ADDED | RESULT RATIO |
|---|---|---|---|---|---|---|---|---|
| Kilocalories | kc | 123 | 4 | | | | | |
| Protein | g | 25.00 | 40 | | | | | |
| Fat | g | 0.610 | 1 | | | | | |
| Methionine | mg | 754 | 141 | | | | | |
| Vitamin B6 | mg | 0.119 | 6 | 6336.1 | 0.15 | 2803 | 0.64 | 1000 |
| Folate | ug | 21.00 | 11 | 35.904 | 30 | 14.8 | — | — |
| Vitamin B12 | ug | 1.200 | 60 | 628.33 | | | | |
| Magnesium | mg | 6000 | 2 | 125.66 | | | | |

(36) - CREAM-SOUR-CULTURED

| SERVING SIZE 1 ITEM 230 g | | | % OF RDA | RATIO METHIONINE TO: | ADDED | RESULT RATIO | ADDED | RESULT RATIO |
|---|---|---|---|---|---|---|---|---|
| Kilocalories | kc | 493 | 22 | | | | | |
| Protein | g | 7.270 | 15 | | | | | |
| Fat | g | 48.20 | 66 | | | | | |
| Methionine | mg | 184 | 43 | | | | | |
| Vitamin B6 | mg | 0.037 | 2 | 4973 | 0.030 | 2746 | 0.10 | 1343 |
| Folate | ug | 25.00 | 14 | 7.36 | | | | |
| Vitamin B12 | ug | 0.690 | 35 | | | | | |
| Magnesium | mg | 26.00 | 9 | 7.077 | | | | |

(22) - CHEESE-AMERICAN-PROCESSED

| SERVING SIZE 1 OUNCE 28.35 g | | | % OF RDA | RATIO METHIONINE TO: | ADDED | RESULT RATIO | ADDED | RESULT RATIO |
|---|---|---|---|---|---|---|---|---|
| Kilocalories | kc | 105 | 5 | | | | | |
| Protein | g | 6.269 | 13 | | | | | |
| Fat | g | 8.844 | 12 | | | | | |
| Methionine | mg | 162 | 38 | | | | | |
| Vitamin B6 | mg | 0.020 | 1 | 8100 | 0.034 | 3000 | 0.08 | |
| Folate | ug | 1.996 | 1 | 4.5 | 24.9 | 18.0 | 8.1 | 1620 |
| Vitamin B12 | ug | 0.197 | 10 | | | | | |
| Magnesium | mg | 5.989 | 2 | 27.049 | 10 | 10.12 | | |

(54) - MILK-1% FAT-LOWFAT FLUID

| SERVING SIZE 1 ITEM 230 g | | | % OF RDA | RATIO METHIONINE TO: | ADDED | RESULT RATIO | ADDED | RESULT RATIO |
|---|---|---|---|---|---|---|---|---|
| Kilocalories | kc | 102 | 5 | | | | | |
| Protein | g | 8.030 | 16 | | | | | |
| Fat | g | 2.590 | 4 | | | | | |
| Methionine | mg | 201 | 47 | | | | | |
| Vitamin B6 | mg | 0.105 | 7 | 1914.3 | 0.025 | 1546 | | - |
| Folate | ug | 12.00 | 7 | 16.75 | | | | |
| Vitamin B12 | ug | 0.898 | 45 | | | | | |
| Magnesium | mg | 34.00 | 12 | 5.9117 | | | | |

(93) YOGURT-PLAIN-LOWFAT

| SERVING SIZE 1 OUNCE 28.35 g | | | % OF RDA | RATIO METHIONINE TO: | ADDED | RESULT RATIO | ADDED | RESULT RATIO |
|---|---|---|---|---|---|---|---|---|
| Kilocalories | kc | 144 | 7 | | | | | |
| Protein | g | 11.90 | 24 | | | | | |
| Fat | g | 3.520 | 5 | | | | | |
| Methionine | mg | 351 | 83 | | | | | |
| Vitamin B6 | mg | 0.111 | 7 | 3162.2 | 0.04 | 2324 | 0.2 | 1129 |
| Folate | ug | 25.00 | 14 | 14.04 | | | | |
| Vitamin B12 | ug | 1.280 | 64 | | | | | |
| Magnesium | mg | 40.00 | 14 | 8.775 | | | | |

EXAMPLE 30-continued

(16) - CHEESE - COTTAGE - WITH FRUIT

| SERVING SIZE 1 ITEM 230 g | | | % OF RDA | RATIO METHIONINE TO: | ADDED | RESULT RATIO | ADDED | RESULT RATIO |
|---|---|---|---|---|---|---|---|---|
| Kilocalories | kc | 279 | 13 | | | | | |
| Protein | g | 22.40 | 45 | | | | | |
| Fat | g | 7.680 | 10 | | | | | |
| Methionine | mg | 673 | 158 | | | | | |
| Vitamin B6 | mg | 0.120 | 9 | 5608.3 | 0.12 | 2804 | 0.32 | 1530 |
| Folate | ug | 22.00 | 12 | 30.59 | 23 | 14.9 | | |
| Vitamin B12 | ug | 1.120 | 56 | | | | | |
| Magnesium | mg | 9.000 | 3 | 74.77 | 36 | 15.0 | | |

An equation which may be used for the method of modifying dairy and other products are presented here. This equation is as follows:

For vitamin B6, an enriching equation is:

$$\frac{Vm^*}{10,000} \times \left(1 + \frac{Vm^*}{2680}\right) = B6(\text{mg}) \text{ (to be added)}$$

*$Vm$ = methionine value

These equations enable the calculation of the amount of B6, folic acid and magnesium to be added to each product to reduce the ratio of methionine: other additive. This is different than a regular approach to enrichment, and usually the amount of B6 to be added in order to reduce the ratio significantly are smaller compared to the amounts usually accepted in "enrichment". Another advantage is that one does not necessarily need to know the amount of B6 in the specific product and the added B6 is based more on the amount of methionine which is more stable and does not change like B6 does.

An example will present the relevant and functionality of the equation:

Cheese (ricotta-skim milk) 698(meth-mg) and 0.049(B6-mg). 698:10000×(1+698:2680)=0.088 B6 to be added whereas the initial meth:B6 ratio is 14245:1, following the calculation and accordingly adding 0.088, the new ratio between meth:B6 is now 698:(0.049+0.088=0.137)=5095.

This means that with small amount of added B6, which is only 4% of the daily recommendation we attain a reduction of meth:B6 from 14245 to 5095.

The equation is based on mathematic processing of the ratios as well as the absolute amounts.

Another example of the equation:

Cheese (cottage uncreamed) 754(meth-mg), 0106(B6-mg) meth:B6 ratio=6336 754:10000×(1+754:2680)=0.0965

When adding this to the internal B6 in the product, the ratio is now: 754:0.2156=3497. It means that adding 0.0965, which is only 4.8% of the daily allowance, reduced the ratio from 6336 to 3497; namely by 45%

Lower methionine "portions" reduce the multiplying factor:

Fish Stick (Breaded frozen and cooked) (46g) contains 120mg METH, 0.017 mg B6 and the ratio is 7059:1. 12:10000×(1+120:2680)=0.0125.

Following adding this amount to the portion, the calculated ratio was reduced from 7059 to 4000. Meaning reducing the ratio by the ratio reduced by at least 44% by adding 0.6% of the RDA for B6.

I claim:

1. A method of modifying a food product having a methionine to vitamin B6 ratio (mg/mg) of greater than 3,000 to 1 to a reduced methionine to vitamin B6 ratio, the method comprising the step of adding to the food product at least one source of vitamin B6 in an amount sufficient to reduce said methionine to vitamin B6 ratio (mg/mg) in said food product to below 3,000:1.

2. The method of claim 1, wherein said ratio of methionine to vitamin B6 (mg/mg) is reduced to a range of 100–3,000 to 1.

3. The method of claim 1, wherein said ratio of methionine to vitamin B6 (mg/mg) is reduced to a range of 300–2,000 to 1.

4. The method of claim 1, wherein said ratio of methionine to vitamin B6 (mg/mg) is reduced to a range of 450–1,000 to 1.

5. The method of claim 4, further comprising the step of adding to the food product at least one source of folic acid in an amount sufficient to reduce a methionine to folic acid ratio (mg/mcg) in said food product to a range of 3.5–15 to 1.

6. The method of any of claims 1, 2 and 3, further comprising the step of adding to the food product at least one source of folic acid in an amount sufficient to reduce a methionine to folic acid ratio (mg/mcg) in said food product to a range of 1.5–30 to 1.

7. The method of claim 6, wherein said methionine to folic acid ratio (mg/mcg) is reduced to a range of 5–9 to 1.

8. The method of claim 7, further comprising the step of adding to the food product at least one source of magnesium in an amount sufficient to reduce a methionine to magnesium ratio (mg/mg) in said food product to a range of 3–18 to 1.

9. The method of claim 1, further comprising the step of adding to the food product at least one source of magnesium in an amount sufficient to reduce a methionine to magnesium ratio (mg/mg) in said food product to a range of 2–30 to 1.

10. The method of claim 9, wherein said methionine to magnesium ratio (mg/mg) is reduced to a range of 6–15 to 1.

* * * * *